United States Patent [19]
Conrad

[11] 3,831,932
[45] Aug. 27, 1974

[54] TAKE-OFF MECHANISM FOR SHEET DELIVERY APPARATUS USED WITH A PRINTING PRESS

[75] Inventor: Karl Conrad, Dietzenbach, Germany

[73] Assignee: Roland Offsetmaschinenfabrik Faber & Schleicher AG, Offenbach/Main, Germany

[22] Filed: July 20, 1972

[21] Appl. No.: 273,620

[30] Foreign Application Priority Data
July 23, 1971   Germany.............................. 2136810

[52] U.S. Cl.................... 271/182, 271/85, 271/203, 271/204
[51] Int. Cl............................................ B65h 29/10
[58] Field of Search............ 271/79, 68, 85, 84, 82, 271/69, 71, 76, 203, 204, 206, 182, 183

[56] References Cited
UNITED STATES PATENTS

| | | | |
|---|---|---|---|
| 2,657,052 | 10/1953 | Elliott................................. | 271/79 |
| 2,684,241 | 7/1954 | Peyrebrune et al................... | 271/68 |
| 2,756,995 | 7/1956 | Koch................................. | 271/79 X |
| 3,730,517 | 5/1973 | Norton............................ | 271/79 X |

FOREIGN PATENTS OR APPLICATIONS
1,170,965   5/1964   Germany.............................. 271/68

Primary Examiner—Richard A. Schacher
Assistant Examiner—Bruce H. Stoner, Jr.
Attorney, Agent, or Firm—Wolfe, Hubbard, Leydig, Voit & Osann, Ltd.

[57] ABSTRACT

A take-off mechanism for delivering a series of sheets from a conveyor onto a delivery pile. Positive transfer of the sheets from the grippers on the conveyor to the jaws of the take-off mechanism is effected by moving the jaws along a take-off path which coincides with the conveyor delivery path and at the same speed as the sheet and by engaging the jaws prior to the time the grippers are released. Stationary cams are used to close and open the jaws adjustable for both the timing and amount of opening. The transport mechanism for the take-off jaws includes cams synchronized with the conveyor for imparting separate horizontal and vertical components of movement to the jaws so that the jaws move in a predetermined closed loop path having transfer, deceleration and return portions.

9 Claims, 4 Drawing Figures

TAKE-OFF MECHANISM FOR SHEET DELIVERY APPARATUS USED WITH A PRINTING PRESS

This invention relates to improvements in sheet delivery mechanisms associated with a lithographic press wherein sheets are conveyed rapidly in succession on an endless conveyor, from which the sheets are individually taken by a synchronized take-off mechanism which decelerates the sheets and permits them to drop onto a delivery pile. More particularly, the present invention relates to an improvement wherein sheets can be transferred from the conveyor to the take-off mechanism with positive control and without damage to the sheets.

Take-off mechanisms such as disclosed in German Pat. No. 1,170,965 employ take-off jaws which are controlled by cams traveling with the chain conveyor. Because the control cams travel with the conveyor, the take-off jaws must travel at a different speed than the conveyor. As a result, the sheet must be released from the chain conveyor before being gripped by the take-off jaws producing a so-called "flying" sheet transfer between the conveyor and the take-off jaws.

Several problems are present with such "flying" sheet transfer. Most delivery arrangements include braking devices such as suction rollers which act on the sheet during its travel over the delivery pile so as to enhance orderly piling. Because of variations in the retarding action of the braking means as well as miscellaneous frictional effects and the variations in inertia when running sheets of different thickness the action of the sheet during the "fly" is not wholly predictable and the sheet tends to get out of control. This time interval can be reduced by employing a high relative speed between the conveyor and the take-off jaws. However, this has the adverse affect of causing the sheet to strike the stops of the take-off jaws at a high speed which can result in damage to the leading edge of the sheet. Thus, take-off mechanisms relying on control cams traveling with the conveyor are not completely suitable particularly with modern high speed conveyors. While suction take-off devices have been used to ameliorate these effects, it is difficult to achieve proper gripping action, particularly when thick sheets are being handled.

Accordingly, it is an object of the invention to provide an improved sheet delivery arrangement in which positive control of the sheet is maintained during the transfer of the sheet from the conveyor to the take-off mechanism and in which "flying" transfer is avoided.

A further object of the present invention resides in providing a delivery arrangement wherein sheet transfer between the conveyor and the take-off mechanism is not adversely influenced by either the weight or thickness of the sheet being transferred or the presence of braking means for assisting in sheet deceleration. On the contrary the degree of retardation and other influences acting upon the sheet and the thickness and characteristics of the sheet itself may vary over wide limits while assuring reliability of take-off, freedom of damage to the sheet, and orderliness in piling.

A further object is to provide a novel means for affecting sheet transfer between a conveyor and take-off mechanism which is capable of operating over a wide range of conveyor speeds including the highest speeds which may be practically achievable.

It is still a further object of the present invention to provide a sheet delivery arrangement employing take-off jaws which can, by simple adjustment, be adapted to handle sheets of varying thickness.

It is finally, an object of the invention to provide a sheet transfer mechanism which is simple and inexpensive to construct and maintain and which can be employed universally in the controlled transfer of sheets from a conveyor to a delivery pile.

Other objects and advantages of the invention will become apparent upon reading the attached detailed description and upon reference to the drawings in which.

While the invention will be described in connection with a preferred embodiment, it will be understood that it is not intended to limit it to the particular embodiment shown, but it is intended, on the contrary, to cover the various alternative and equivalent constructions included within the spirit and scope of the appended claims.

Figure 1:
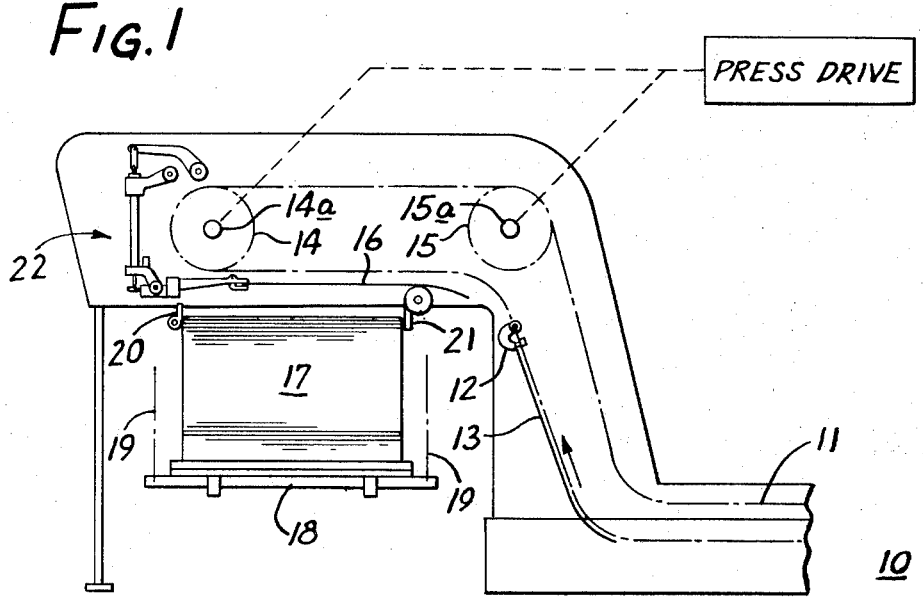
FIG. 1 is a diagrammatic side elevation view of a delivery arrangement employing the present invention.

Turning now to the drawings, and particularly FIG. 1, there is shown a delivery arrangement having a frame 10 mounting an endless conveyor chain 11 which is diagrammatically indicated by the dot-dash line and which carries a series of grippers 12 for gripping a series of sheets 13 transported from a lithographic printing press. The chain is trained around rollers or sprockets 14, 15 mounted on shafts 14a, 15a and which are driven at "press" speed via an appropriate connection from the press drive, not shown. The sheets 13, upon arrival, may be printed on either side or both sides.

The purpose of the conveyor is to convey sheets along a conveyor delivery path 16 to a position above a delivery pile 17. The pile is supported on a platform 18 which is suspended upon chains diagrammatically indicated at 19 having provision for progressive sinking movement as sheets are added to the top of the pile. To form a straight stack, a series of "front" guide members 20 are provided at the left hand side of the pile and a series of "rear" guide members 21 are provided along the right hand side of the pile. The means for maintaining the top of the pile at a constant level by gradual lowering of the platform does not form a part of the present invention and for details of the automatic level adjusting mechanism cross reference is made, for example, to U.S. Pat. No. 2,262,236.

Figure 2:
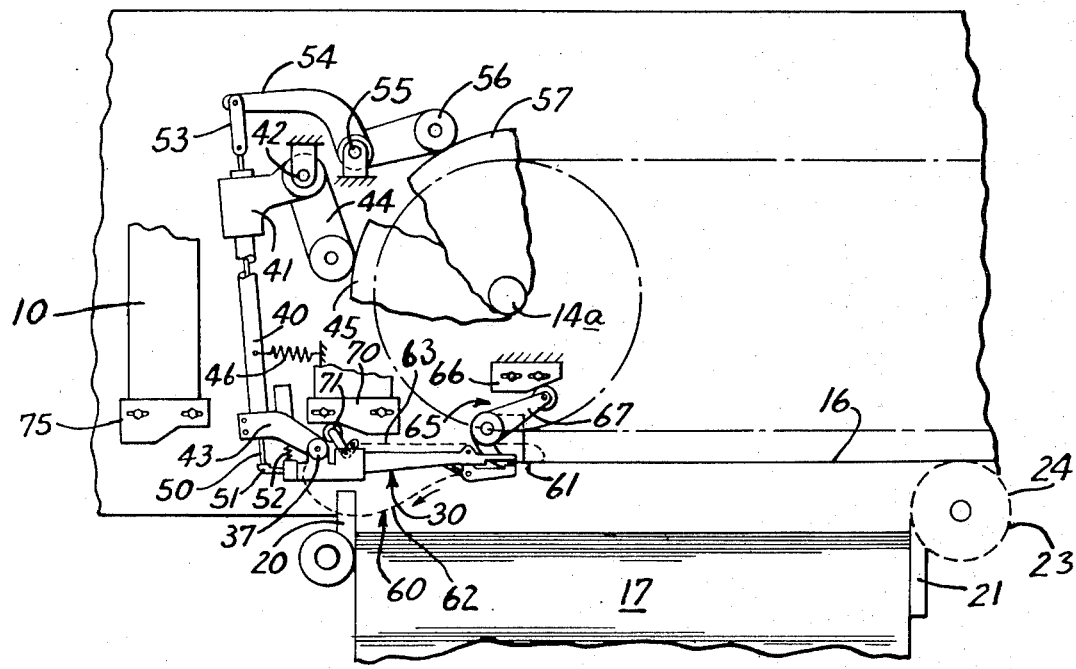
FIG. 2 is an enlarged diagrammatic side elevation view showing the take-off mechanism of FIG. 1.

For transferring successive sheets from the conveyor, for decelerating them, and for depositing them on the pile 17, a take-off mechanism 22, which engages the leading edge, is provided. In order to slow down the body and tail of the sheet, conventional decelerating means may be used, for example, a suction roller in the form of a hollow cylinder 23 (as shown in FIG. 2) having perforations 24 mounted slightly below the level of the path 16 and driven at a peripheral speed which is slower than that of the conveyor. The function of the take-off mechanism 22 is to grip the presented front edge of an oncoming sheet prior to release of the grippers on the conveyor and to lower it out of the conveyor delivery path while decelerating it for depositing upon the pile.

In accordance with the present invention means are provided for transporting the take-off jaws in a closed loop path having an initial or take-off portion which coincides with the conveyor delivery path and at a speed during take-off which is equal to the conveyor speed. The take-off jaws are timed to close before the grippers on the conveyor are opened so that the leading edge of the sheet is at all times under control and with the sheet subsequently being lowered from the conveyor path and decelerated for depositing upon the pile. Further in accordance with the invention the take-off jaws are transported with separate horizontal and vertical components of movement separately derived and synchronized by respective cams on the conveyor shaft. In carrying out the invention the take-off mechanism includes a horizontally extending take-off arm which is pivoted to the lower end of a vertical support arm, with means for swinging the support arm back and forth to impart a horizontal component of movement to the jaws and with additional means, synchronized therewith, for swinging the take-off arm upwardly and downwardly with respect to the support arm for imparting a vertical component to lower the sheet from the conveyor delivery path onto the pile.

Figure 3:
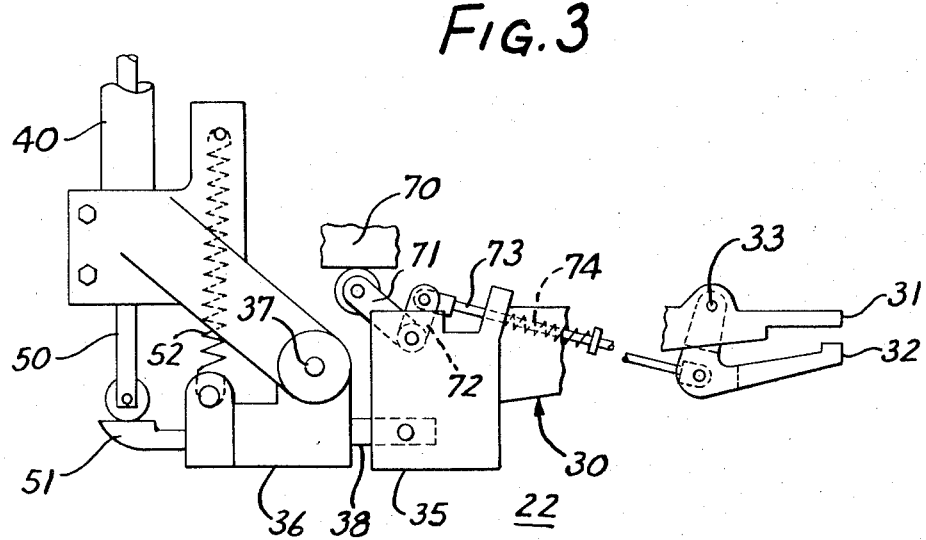
FIG. 3 is an enlarged, diagrammatic segmented side elevation view of the take-off assembly of FIG. 1.
Figure 4:
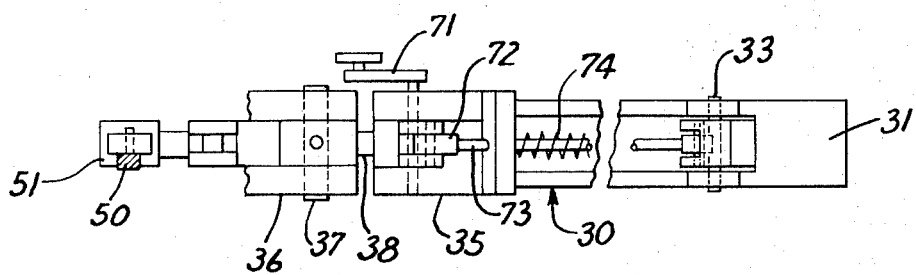
FIG. 4 is a top plan view of the assembly depicted in FIG. 3.

Thus, turning to FIG. 2, and to the enlarged views set forth in FIGS. 3 and 4, the take-off mechanism will be seen to include a take-off arm 30 having jaws 31, 32 at its outer end, the jaw 32 being mounted for relative movement upon a pivot 33. The arm 30 has a two-part mount 35, 36 at its left-hand end, the part 36 having a pivot or hinge 37 to permit swinging movement of the arm in a vertical direction. A connection 38 between the portions 35, 36 of the mount permits relative adjustment thereby to change the effective length of the arm with respect to its pivot.

For the purpose of reciprocating the take-off arm 30 in a horizontal direction it is mounted upon a vertical support arm 40 which in turn has a mount 41 engaging a horizontal pivot 42 at its upper end and a bracket 43 at its lower end, the bracket being pivoted to the arm 30 at the pivot 37. For pendulously swinging, or oscillating, the support arm 40, the mount 41 is rigidly connected to a cam follower arm 44 which engages a cam 45 mounted upon the conveyor shaft 14a. The cam follower arm is kept bottomed on the cam 45 by means of a tension spring 46 or the like. Thus as the shaft 14a rotates, the cam follower arm 44 is rocked back and forth by the cam 45 thereby applying a component of horizontal reciprocating movement to the take-off arm 30 and the jaw which it carries, the instantaneous speed being determined by the slope of the cam and acceleration by changes in slope.

For the purpose of imparting a second, or vertical, component of movement to the jaws, means synchronized with the conveyor are provided for rocking or oscillating the take-off arm 30 about the pivot 37 and relative to the support arm 40. Such relative rocking movement is brought about by a push rod 50 which is telescoped within the support arm 40 and which bears, at its lower end, against an extension 51 on the take-off arm. A spring 52, which interconnects the two arms, maintains the extension 51 bottomed against the rod. At the upper end of the rod a link 53 is provided which is secured to the conveyor shaft 14a.

In carrying out the invention the cams 45, 57 are so contoured that the take-off jaws 31, 32 follow the path of a closed loop 60 indicated by the dotted line in FIG. 2. The closed loop includes an initial or take-off path 61 which is horizontal and which coincides with the conveyor delivery path 16. The portion of the cam 45 which is effective to move the jaws over the take-off path 61 is such as to move the jaws at the same speed as the grippers on the conveyor. The cam 56 is so contoured so that during the time the take-off jaws are in the initial or take-off path 61, the slope is substantially zero so that the jaws are transported horizontally. This permits engagement of the leading edge of the sheet by the take-off jaws during the time that the sheet is still engaged by the grippers.

In order to release the grippers on the conveyor at a predetermined point in the delivery path, the conveyor, in accordance with conventional practice, is provided with a gripper release mechanism 65 which includes a stationary cam 66 and a cam follower 67. For closing the take-off jaws 31, 32 when the jaws are in the initial or take-off path 61, which coincides with the conveyor delivery path, jaw actuating means are provided including a stationary cam and cam follower. Thus, referring to FIG. 3 a stationary cam 70 is provided mounted upon the frame of the machine and engaged by a cam follower 71. The cam follower forms a part of a bell crank 72. The end of the bell crank is connected to pull rod 73 which is connected to the jaw 32 and which works against an expansion type coil spring 74. Accordingly during the time that the take-off jaws are in the take-off path, horizontal movement of the take-off arm to the left causes the cam follower 71 to leave the cam 70 so that the spring 74 closes the jaws. The cam 57 is so contoured that when the jaws with their engaged sheet leave the take-off portion 61 of the path, the bell crank 54 is caused to rock clockwise, moving the push rod upwardly which permits the take-off arm to drop under the urging of the spring 52 along the portion 62 of the path clear of the conveyor. During this portion of the movement, the slope of the cam 45 changes so that leftward movement of the engaged sheet is sharply decelerated.

To release the jaws as they approach their left-hand limit of movement for depositing of the sheet with low forward velocity upon the pile, a second stationary cam 75 is provided which is engaged by the cam follower 71 during the "back" portion of the swing. The cams 66, 70 and 75, as will be noted in FIG. 2, all have provision for horizontal adjustment so that the precise moments, or phase positions, of the opening and closing of the jaws and grippers may be adjusted with a high degree of precision. The cam 66 moreover has provision for slight vertical adjustment to control the amount that the jaws are opened which may be varied in accordance with the thickness of the sheet being handled.

While the operation of the delivery arrangement will be apparent from the foregoing description, a typical cycle may be reviewed as follows: A sheet 13 is drawn horizontally to the left at a relatively high but constant speed along the conveyor delivery path 16 into the coincident portion 61 of the path of movement of the take-off jaws. By reason of the slope of the cam 45 acting upon the follower 44 and by reason of the zero slope on the companion cam 57, both of which are synchronized with the conveyor, the jaws are, upon arrival of the gripper, moving in the same plane and at the same horizontal speed. Moreover, because of the cam 70 the jaws at this point are open and opposite the leading edge of the sheet. As the cam follower 71 traverses the cam 70 the jaws close upon the sheet. After a brief but precise time interval, engagement of the gripper cam 66 by the cam follower 67 causes the gripper 12 to open to release the sheet. Note that because of this "overlap" the sheet is never "on the fly"; it is at all times engaged by one gripping means or the other and thus kept under positive control and its position during each point in the delivery cycle is predetermined and unaffected by the various influences such as braking and friction, largely indeterminate, which may be acting on the sheet.

Upon continued leftward movement of the jaws along the take-off path, movement of the cam follower 56 by the cam 57 on the conveyor shaft causes upward movement of the push rod 33 within the support arm 40 so that the jaw arm 30 is swung relatively downwardly, i.e., clockwise about the pivot 27. This lowers the leading edge of the sheet toward the pile along the portion 62 of the path, and at the same time the cam 45 presents a changing slope so that the horizontal movement of the take-off jaws is decelerated from "conveyor" speed to a sharply reduced forward speed. The body and tail of the sheet are correspondingly slowed by the drag provided by the vacuum roller 23. As the sheet comes into proximity with the forward stop 20, the cam follower 71 engages the cam 75 which opens the jaws 31, 32, releasing the sheet so that it drops in registered position upon the pile. The cam 57 rocks the follower 56 clockwise applying pressure to the push rod so to raise the jaws which are then, by reason of inward movement of the cam follower 44 upon cam 45, transported to the right along the return portion 63 of the path. While the two cams 45 and 57 on the conveyor shaft 14a have been described as being independently responsible for the respective horizontal and vertical movements of the jaws, it will be understood that since the movements they impart are arcuate rather than translational, the cams must be coordinatedly contoured to achieve the resultant path 60 illustrated in FIG. 2. Also while the device has been described for simplicity in connection with a single gripper and single pair of take-off jaws, it will be understood that jaws and grippers will be provided at spaced points along the leading edge so that the sheet is drawn straight forward with balanced forces free of locking.

It will be apparent that the objects of the invention have been amply carried out and that delivery may be secured smoothly, reliably and with a high degree of precision at the highest practical conveyor speeds. The term "jaws" as used herein is not used in any limiting way and is intended to cover any means, including vacuum operated, for positively gripping and releasing the leading edge of the sheet. The term "right angles" used herein is intended to be approximate and the terms "horizontal" and "vertical" are also to be relative and approximate. The terms "cam" and "cam followers" are likewise intended to be relative; for example, in the case of the cams 66, 70 and 75, either the cam or its follower may be contoured.

I claim:

1. A delivery arrangement for a sheet-fed printing press for delivering sheets onto a delivery pile, comprising means for supporting a pile of sheets, a conveyor including sheet grippers for conveying sheets individually along a conveyor delivery path to a position above the pile, means for releasing said grippers at a fixed position in the sheet delivery path above the pile, a take-off mechanism including a reciprocal take-off arm, means for reciprocating said take-off arm, take-off jaws mounted upon said take-off arm having transport and actuating means synchronized with the arrival of the sheets for taking the sheets from the conveyor and for decelerating them for depositing on the pile, and means located adjacent the pile below the level of the sheet path for assisting in the deceleration of the sheets, said jaw transport means defining a take-off path for the take-off jaws which has an initial portion which is coincident with the sheet delivery path along a portion thereof and said jaw transport means including means for transporting the jaws at substantially the same speed as the sheets along the take-off path, and said jaw actuating means being timed to close the jaws upon a sheet shortly before release thereof by the grippers so that the sheets are engaged at all times during transfer to the jaws.

2. The combination as claimed in claim 1 in which the jaw actuating means is in the form of a stationary cam and cam follower.

3. A delivery arrangement for a sheet-fed printing press for delivering sheets onto a delivery pile comprising means for supporting a pile of sheets, a conveyor including a series of grippers for gripping the leading edges of successive sheets and for conveying them individually along a conveyor delivery path to a position above the pile, means for releasing the grippers at a predetermined position relative to the pile, a take-off assembly having a pair of take-off jaws mounted upon a take-off arm, means for reciprocating the arm so that the take-off jaws follow a path which is substantially coincident with the path of the sheet as it approaches the point of release by the conveyor grippers and at a speed equal to the conveyor speed, means including a stationary cam for actuating the jaws so positioned that the sheet is gripped by the jaws prior to release by the conveyor grippers, means for rocking the take-off arm downwardly after engagement by the jaws and following release by the conveyor grippers so that the leading edge of the sheet is lowered from the conveyor delivery path toward the pile, and means including a second fixed cam for releasing the jaws to deposit the sheet upon the pile.

4. The combination as claimed in claim 3 in which the means for reciprocating the take-off arm and for rocking the take-off arm are both driven in synchronization with the movement of the conveyor.

5. The combination as claimed in claim 3 in which the conveyor has a conveyor shaft synchronized therewith having first and second rotating cams thereon and in which the rotating cams have cam followers which are coupled to the take-off arm for respectively producing the reciprocating and rocking movement of the latter.

6. A delivery arrangement for a sheet-fed printing press for delivering sheets onto a delivery pile comprising means for supporting a pile of sheets, a conveyor including a series of grippers for conveying sheets individually along a conveyor delivery path to a position above the pile, means for releasing the grippers at a predetermined position relative to the pile, a take-off mechanism including a pair of take-off jaws, first transport means synchronized with the conveyor for transporting the take-off jaws with a first component of movement along a take-off path which initially coincides with the sheet delivery path at a velocity which is substantially equal to the velocity of the conveyor, means for closing the jaws to engage the sheet just prior to release of the grippers, second transport means synchronized with the conveyor for moving the take-off jaws with a second component of movement at right angles to the conveyor delivery path, the movements being so related that the sheet following release by the grippers is decelerated while being drawn downwardly out of the conveyor delivery path toward the pile, and means for releasing the jaws for depositing of the sheet in register with the pile.

7. A delivery arrangement for a sheet-fed printing press for delivering sheets onto a delivery pile comprising means for supporting a pile of sheets, a conveyor including a series of grippers for conveying sheets individually along a conveyor delivery path to a position above the pile, means for releasing the grippers at a predetermined position with respect to the pile, a take-off assembly including a pair of jaws mounted on a generally horizontally extending take-off arm, a generally vertically extending support arm pivoted at its upper end for swinging movement and pivoted at its lower end to the take-off arm, first means synchronized with the conveyor for swinging the support arm back and forth so that the jaws are transported horizontally along a take-off path which is in the same direction as the conveyor, delivery path and at the same speed as the conveyor and with the jaws being subsequently decelerated, second means synchronized with the conveyor for causing the jaws to move along a take-off path which is substantially coincident with the delivery path and for subsequently rocking the take-off arm downwardly out of the delivery path and toward the pile as it is decelerated, means for closing the take-off jaws upon the leading edge of the sheet just prior to release of the grippers, and means for opening the take-off jaws following deceleration for depositing the sheet in register upon the pile.

8. The combination as claimed in claim 7 in which the means for closing and opening the jaws is in the form of respective stationary but adjustable cams arranged in the path of horizontal movement of the take-off arm.

9. A delivery arrangement for a sheet-fed printing press for delivering sheets onto a delivery pile comprising means for supporting a pile of sheets, a conveyor including a series of grippers for conveying sheets horizontally along a conveyor delivery path to a position above the pile, means for releasing the grippers at a predetermined position in the path of horizontal movement, a take-off assembly including a pair of jaws mounted on a generally horizontally extending take-off arm, a generally vertically extending support arm pivoted at its upper end for swinging movement and pivoted at its lower end to the take-off arm, said conveyor having a shaft rotating synchronously therewith, a first rotary cam on the shaft, a first cam follower for engaging the first cam for swinging the support arm back and forth, the first cam being so contoured as to transport the jaws along a take-off path the initial portion of which coincides with the conveyor delivery path and at the same speed as the conveyor followed by deceleration, a second rotary cam on the shaft, means including a second cam follower engaging the second cam for rocking the take-off arm upwardly and downwardly with respect to the support arm, the second cam being so contoured as to maintain the jaws at a constant level over this initial portion of the take-off path and for subsequently lowering the jaws as they are decelerated, means including a first stationary cam for closing the jaws upon the leading edge of the sheet at the initial portion of the take-off path and prior to release of the sheet by the conveyor grippers so that the sheet is constantly engaged, and means including a second stationary cam for releasing the jaws following deceleration for depositing the sheet upon the pile.

* * * * *